April 14, 1953 N. B. MURPHY 2,634,841
CAM RELEASED PIN CLUTCH
Filed Dec. 27, 1945 2 SHEETS—SHEET 1
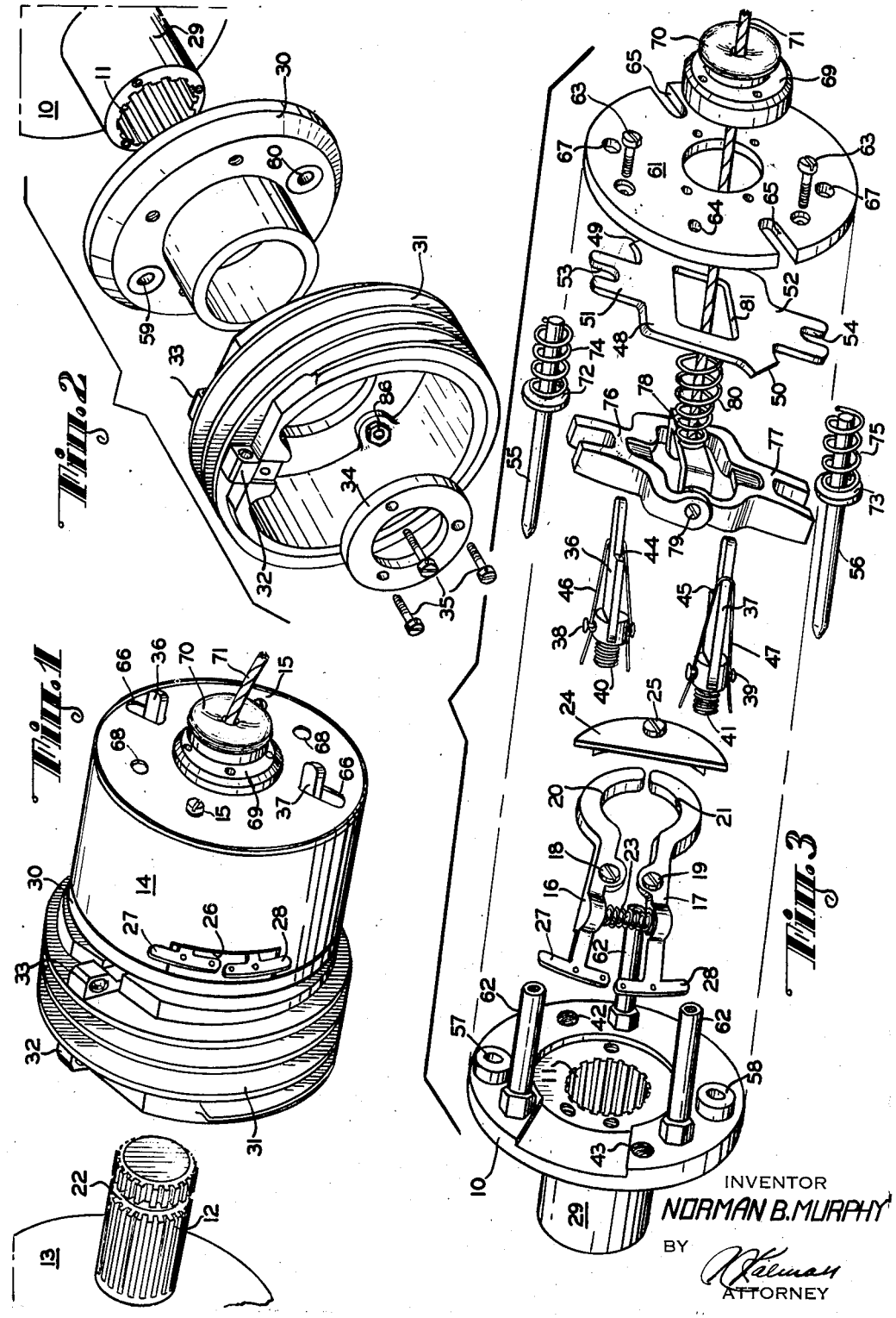
INVENTOR
NORMAN B. MURPHY
BY
ATTORNEY April 14, 1953
N. B. MURPHY
2,634,841
CAM RELEASED PIN CLUTCH
Filed Dec. 27, 1945
2 SHEETS—SHEET 2
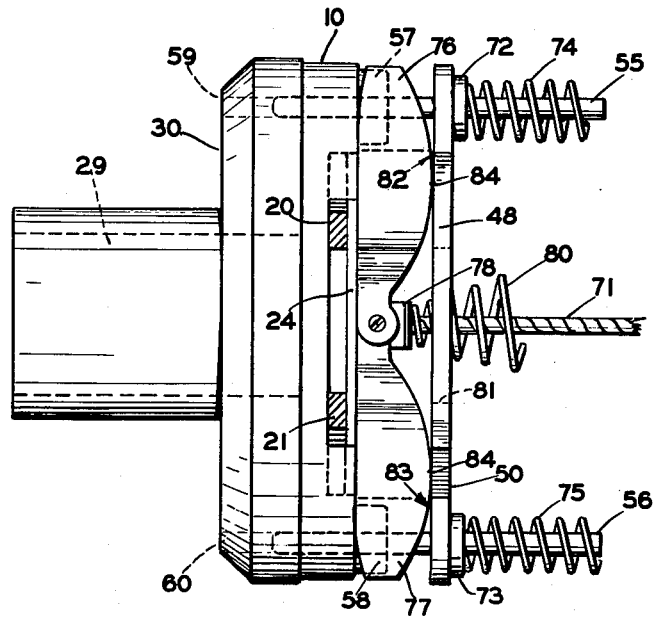
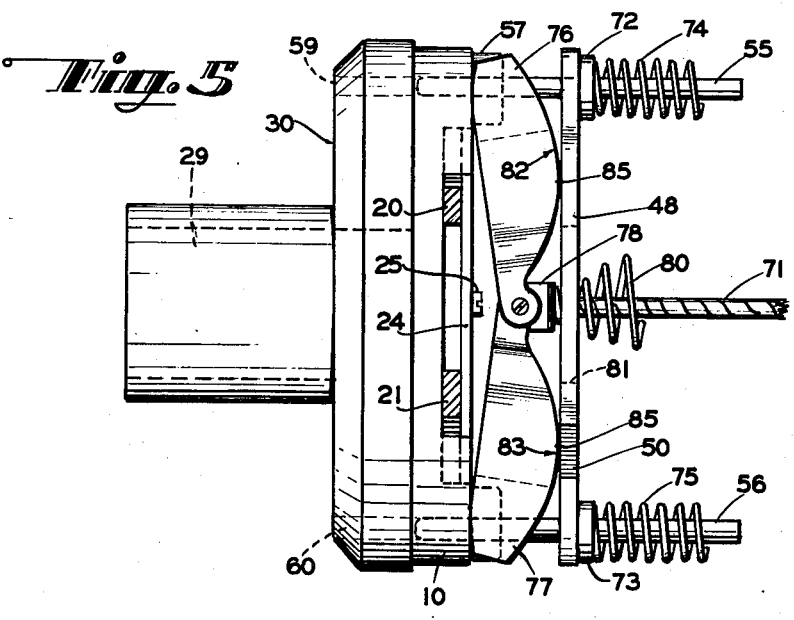
INVENTOR.
NORMAN B. MURPHY
BY
ATTORNEY Patented Apr. 14, 1953

2,634,841

UNITED STATES PATENT OFFICE 2,634,841

CAM RELEASED PIN CLUTCH

Norman B. Murphy, West Englewood, N. J., assignor to Bendix Aviation Corporation, Teterboro, N. J., a corporation of Delaware Application December 27, 1945, Serial No. 637,377

7 Claims. (Cl. 192—99)

The present invention relates to disconnecting apparatus generally and more particularly constitutes an improvement over the disengaging means described and claimed in copending application Serial No. 534,969 filed May 10, 1944, and now Patent No. 2,399,821, issued May 7, 1946.

The emergency disconnect device of the aforementioned application consists generally in a driven member and a driving member which is operated through a shaft of a driving motor, the driving member carrying a relatively movable spider provided with a plurality of pins thereon for movement in one direction to engage registering means on the driven member so that the latter is driven by the driving member and for movement in an opposite direction to disconnect the registering means so that the driving connection between the driving and driven members is broken. A cable is provided for actuating the spider and its pins to the disconnected position and since the spider must be actuated against a relatively strong compresion spring a considerable amount of effort is required on the part of the operator to operate the spider to the desired position.

Moreover, in order to define a desirable lock between the shaft of the driving motor and the driving member which receives the shaft, a washer was provided on the shaft adjacent the driving member and forced on one side away from the latter to bite into the shaft whereby relative longitudinal motion between the two was positively prevented. This, however, has proved to be an undesirable expedient especially where rapid disassembly of the driving member from the motor shaft is required.

An object of the present invention, therefore, is to provide a novel releasable coupling which is operable with the minimum requirement of effort on the part of the operator to rapidly and positively disconnect a driven member from a driving member.

Another object of the invention is to provide a novel emergency disconnect device for uncoupling a driven member from a driving member wherein cam means are utilized to facilitate the uncoupling action of the two members.

A further object is to provide in an emergency disconnect device of the character described novel retaining means for holding the motor shaft and the driving member together, such means comprising a pair of spaced levers pivoted on the driving member and yieldably urged to be positioned in an annular transverse groove formed in the shaft, the levers being arranged to have a scissor action and provided with extensions protruding from an aperture formed in the casing of the device whereby the levers may be manually operated from outside of the casing for retraction from out of the shaft groove so that the shaft and the driving member may be readily and rapidly disassembled.

The above and further objects and novel features of the invention will more fully appear from the following detailed description when the same is read in connection with the accompanying drawings. It is to be expressly understood, however, that the drawings are for purposes of illustration only and are not intended as a definition of the limits of the invention.

In the drawings, wherein like reference characters refer to like parts throughout the several views:

Figure 1 is a perspective view of the novel disconnect device of the present invention as applied to the shaft of a driving motor;

Figure 2 is an exploded perspective view of the novel disconnect device of Figure 1; and, Figure 3 is a fragmentary showing in perspective of a portion of the structure of Figure 2.

Figure 4 is a fragmentary elevational view of a portion of the structure shown in Figure 3 showing in particular the cam actuating means in clutch-engaging position.

Figure 5 is a view similar to Figure 4 but showing the cam actuating means in clutch-disengaging position.

Referring now to the drawings for a more detailed description of the present invention, the novel disconnect device is shown in Figure 3 as comprising a driving member or hub 10 having a splined opening 11 for the reception of a splined shaft 12 of a servo or driving motor 13 (Figure 1). A cylindrical casing 14 is suitably fastened to hub 10 by means of screws 15 and shaft 12 is adapted to extend somewhat into the interior of the casing.

Novel means is provided for securing the motor shaft and the driving member against relative longitudinal motion which comprises a pair of levers 16 and 17 mounted on member 10 by means of screws 18 and 19 for pivotal motion toward and away from each other, i. e., in the nature of a scissor action. The inner end of each lever is provided with an arcuate surface 20 and 21 adapted for reception by an annular transverse slot 22 formed in motor shaft 12. A compression spring 23 arranged between the two levers normally urges the arcuate surfaces 20 and 21 into slot 22 of the motor shaft whereby hub 10, when mounted on shaft 12, is prevented from rotating relative to the shaft due to the splines provided on the hub and the shaft and from longitudinal motion relative to the shaft because of the lock defined by the levers when their arcuate surfaces rest within the shaft slot. Fitted over the end of shaft 12 and the arcuate surfaces of the two levers is a retainer plate 24 which is fastened to hub 10 by means of a bolt 25.

The outer end of each lever extends through an aperture 26 formed in the side of casing 14 and each lever end terminates in a cross piece 27 and 28 which, due to the action of compression spring 23, normally assume the position shown in Figure 1. For readily disassembling the entire disconnect device from the driving motor without disturbing the mechanism within casing 14, the operator merely grasps cross pieces 27 and 28 and depresses them toward each other whereby the levers pivot on their pivots 18 and 19 to further compress spring 23 and withdraw their arcuate surfaces 20 and 21 from out of the motor slot 22 whereupon the device may be withdrawn from shaft 12. To reassemble, hub 10 is slipped on shaft 12 and forced inwardly until the end of the shaft engages plate 24 and, thereafter, cross pieces 27 and 28 are released and spring 23 snaps the arcuate surfaces of the levers into the shaft slot.

Sleeved about the decreased portion 29 of hub 10 is a bushing 30 which has suitably fastened thereto a pulley 31 by four bolts 86, one of which is shown in Figure 2, the pulley being provided with lugs 32 and 33 for anchoring the two ends of a cable (not shown) which is wrapped over the pulley and connects with a surface or member to be controlled manually or by motive means. When bushing 30 and pulley 31 are slipped onto the portion 29 of hub 10, a retainer ring 34 is fastened to the face of portion 29 by means of bolts 35 whereby the bushing and pulley are maintained against axial motion relative to the hub. Moreover, the provision of ring 34 maintains the bushing and pulley on the driving hub for angular motion relative to the hub when the bushing and hub are uncoupled and for motion therewith when the two are drivably connected in the manner hereinafter described.

As more clearly shown in Figure 3, a pair of levers 36 and 37, in the form of fingers or latches, are provided which are pivotally mounted by means of pins 38 and 39 upon bolts 40 and 41 which are received within threaded apertures 42 and 43 formed on hub 10. Both levers are provided with corresponding latch portions 44 and 45 and both are normally yieldably urged toward each other by virtue of clothespin type springs 46 and 47.

A clutch member in the form of a plate or spider member 48 is provided having a pair of guiding surfaces 49 and 50 which are engaged by levers 36 and 37 on their facing surfaces when the device is assembled. Spider 48, further, is provided with a pair of arms 51 and 52 having slots 53 and 54 at their ends for the reception of a pair of pins or clutch engaging members 55 and 56. The latter pins normally rest within inserts or registering means 57 and 58 fastened to and passing through hub 10 and under certain conditions, to be presently described, are urged beyond the hub to be received within apertures or registering means 59 and 60 provided within bushing 30. In such an event, the driving member 10 and driven member 30 will be drivably connected with each other.

A centrally apertured plate 61 is secured to driving member 10 by way of spacers 62 and bolts 63 thereby defining an assembly for the driving member which receives casing 14, the latter being secured to plate 61 by way of screws 15 and threaded apertures 64 formed in the plate. Plate 61 and the closed end of casing 14 are provided with diametrically opposed and aligned slots 65 and 66 for the reception of the extended ends of levers 36 and 37 as shown in Figure 1. Both plates 61 and the closed end of casing 14 are further provided with aligned apertures 67 and 68 for accommodating the free ends of pins 55 and 56 therein. Secured to plate 61 over the aperture thereof is an apertured boss 69 having secured thereto or formed integrally therewith a flared insert 70 provided with a central aperture therein for the reception of a cable 71, the closed end of casing 14 being centrally apertured for accommodating boss 69.

When the entire unit is assembled and casing 14 secured to plate 61, pins 55 and 56 rest within slots 53 and 54 of spider 48 while their inner ends are received within inserts 57 and 58 and their outer ends are received within apertures 67 of plate 61 and apertures 68 of the closed end of casing 14. Pins 55 and 56, moreover, are provided with limit stops 72 and 73 which normally rest on spider 48 on that side thereof which faces plate 61 and arranged between such stops and plate 61 are coil springs 74 and 75. Guiding surfaces 49 and 50 of spider 48 normally rest upon latch surfaces 44 and 45 and springs 74 and 75 are stressed so that upon distending levers 46 and 47, latching surfaces 44 and 45 are pivoted away from spider 48 so that springs 74 and 75 urge pins 55 and 56 as well as the spider axially toward member 10 and as soon as inserts 57 and 58 are in registry with openings 59 and 60, the pins pass into the latter openings and a drivable connection is established between the driving and driven members. Springs 74 and 75 urge clutch engaging members 55 and 56 into engagement with registering means 57, 58, 59, 60 when levers 36 and 37 are operated to release the clutch engaging members.

Coming now to one of the novel features of the present invention, a pair of cam levers 76 and 77 is provided, the outer end of each lever resting by virtue of its slotted end about each of inserts 57 and 58 on hub 10 and the inner ends of the levers being pivotally connected with each other and with a bridging or yoke member 78 through screws 79 (one of which is shown in Figure 3). Cable 71 is anchored to yoke 78 and surrounding the cable is a compression spring 80 which rests at one end on yoke 78 and passes through an aperture 81 formed in spider 48 to rest against boss 69. The cam surfaces 82 and 83 of levers 76 and 77 respectively rest against the underside of spider 48 when pins 55 and 56 are within apertures 59 and 60 as shown in Figure 4. It is apparent that in this position a point such as 84 on cam surfaces 82 and 83 will define the point of contact between levers 76, 77 and spider plate 48.

In order to retract pins 55 and 56 from driven member 30 and thereby break the driving connection, the free end of cable 71 is pulled outwardly thereby retracting bridge member 78 in an axial direction toward plate 61. As cable 71 is pulled outwardly springs 74 and 75 compress and maintain the outer ends of cam levers 76 and 77 on hub 10 against axial motion as shown in Figure 4. As a result, the pivoted inner ends of levers 76 and 77 will be moved by bridge member 78 away from hub 10 thereby rolling and sliding over surfaces 82 and 83 along spider 48 to change the previous point of contact 84 to a new point of contact 85, for example, as shown in Figure 5. Levers 76 and 77 by reason of cam surfaces 82 and 83 will move spider 48 axially away from the hub whereby springs 74 and 75 become fully compressed and pins 55 and 56 are withdrawn from inserts 59 and 60 of driven member 30 (Figure 5). It is apparent that the cam surfaces provide a smooth and effective means for moving the spider to the position of Figure 5 to disengage pins 55 and 56 from the driven member. Spider 48 is moved outwardly toward plate 61 until its guiding surfaces 49 and 50 pass beyond latch portions 44 and 45 whereupon the levers 36 and 37 are urged inwardly to latch the spider in its retracted position. With the retraction of the spider, pins 55 and 56 are withdrawn from bushing 30 and springs 74 and 75 will remain compressed for a subsequent clutching operation. As soon as the spider is locked by levers 36 and 37, the cable is released and spring 80 snaps bridge 78 and cam levers 76 and 77 to a normal position wherein the cam levers will rest upon retainer plate 24.

It will now be apparent that cam levers 76 and 77 provide an increase in the force available for lifting the spider and pins 55 and 56 to disengage bushing 30 thereby providing a mechanical advantage to the operator whereby he need exert only a minimum amount of effort to disconnect the driven pulley from the driving motor.

To re-establish the driving connection between the pulley and the driving motor, levers 36 and 37 are grasped exterior of casing 14 and spread outwardly whereupon latch portions 44 and 45 release spider 48 and springs 74 and 75 urge the spider and pins 55 and 56 until the pins pass into aperture 59 and 60 of bushing 30.

Although but a single embodiment of the present invention has been illustrated and described in detail, it is to be expressly understood that the invention is not limited thereto. Various changes may be made in the design and arrangement of parts without departing from the spirit and scope of the invention as will now be understood by those skilled in the art. For a definition of the limits of the invention, reference will be had primarily to the appended claims.

I claim:

1. In combination, a driving member, a driven member, a clutch comprising registering means on said driving and driven members and engaging means carried by said driving member for connecting and disconnecting said registering means, a yieldably urged lever carried by said driving member for maintaining said clutch engaging means disconnected from said registering means on said driven member, said lever being adapted for releasing said engaging means to effect connection of said engaging means with said registering means, means for urging said engaging means to a position for connecting said registering means when said lever has been operated to release said engaging means, and cam levers between said driving member and said engaging means for operating said engaging means to disconnect said registering means.

2. In combination, a driving member, a driven member, a clutch comprising registering means on said driving and driven members and engaging means carried by said driving member for connecting and disconnecting said registering means, said engaging means comprising at least one engaging member thereon for engaging said registering means to establish a drivable connection between said driving and driven members, a pivotally mounted lever on said driving member and adapted to serve as a latch for holding said engaging means out of engagement with said registering means on said driven member, said lever being displaceable for releasing said engaging means, means acting upon said engaging means for urging said engaging means into engagement with said registering means on said driving and driven members when said lever has been operated to release said engaging means, and means comprising at least one cam lever mounted between said driving member and said engaging means for disconnecting said engaging means from said registering means.

3. In combination, a driving member, a driven member, a pivotally mounted lever carried by said driving member, clutch means adapted for movement in a direction substantially lengthwise of said lever in one direction to engage said driven member and in the opposite direction to disengage said driven member, said lever being yieldably urged to maintain said clutch means in a disengaged condition and operative to release said clutch means, means for urging said clutch means to engage said driven member when said lever has been operated to release said clutch means, and cam toggle levers carried by said driving member for displacing said clutch means to effect a disengaged condition thereof whereupon said lever engages said clutch means to maintain it in said last-named condition.

4. A coupling device for drivably connecting a driving member to a driven member comprising a relatively movable spider supported by said driving member, a plurality of pins carried by said spider, receptive means in said driven member for cooperating with said pins, said spider having a first position wherein said pins engage said receptive means to thereby establish a drivable connection between said driving and driven members and a second position wherein said pins are held out of engagement with said receptive means whereby said driving and driven members are disconnected, a plurality of pivotally mounted levers yieldably urged to lock said spider in said second position, said levers being adapted for unlocking said spider, means for urging said spider to said first position when said spider has been unlocked by said levers, a pair of aligned cams mounted on said driving member and engaging said spider, and means connected to said cams for urging said spider to said second position.

5. In combination with a disconnect device comprising a driving member adapted for receiving a driving shaft therein and a driven member together with means for connecting and for disconnecting said driving member to and from said driven member, of means for locking said driving member against rotation relative to said shaft, and means for locking said driving member against axial movement relative to said shaft comprising a transverse slot formed on said shaft and a lever pivotally mounted on said driving member and yieldably urged to engage with the slot of said shaft.

6. In combination with an emergency disconnect device comprising a rotatable driving member adapted for receiving a rotating driving shaft therein and a driven member together with means for connecting and for disconnecting said driving member to and from said driven member, said driving member being provided with an apertured casing therefor, of means for locking said driving member against axial motion relative to said shaft comprising a transverse slot formed on said shaft and a lever pivotally mounted on said driving member and yieldably urged to engage with the slot of said shaft, said lever extending through the aperture of said casing for operation exterior of the casing whereby said shaft is unlocked from said driving member, and means for locking said driving member against rotation relative to said shaft.

7. A coupling device for drivably connecting a driving member to a driven member, comprising a relatively movable spider supported by said driving member, a plurality of pins carried by said spider, receptive means in said driven member for cooperating with said pins, said spider having a first position wherein said pins engage said receptive means to thereby establish a drivable connection between said driving and driven members and a second position wherein said pins are held out of engagement with said receptive means whereby said driving and driven members are disconnected, a plurality of pivotally mounted levers yieldably urged to lock said spider in said second position, said levers being adapted for unlocking said spider, means for urging said spider to said first position when said spider has been unlocked by said levers, a pair of levers carried by said driving member pivotally connected to each other at their inner ends and having cam surfaces thereon for engaging said spider, and means connected to said levers for urging said spider to said second position.

NORMAN B. MURPHY.

References Cited in the file of this patent

UNITED STATES PATENTS

| Number | Name | Date |
|---|---|---|
| 231,828 | McCord | Aug. 31, 1880 |
| 350,713 | Bailey | Oct. 12, 1886 |
| 795,808 | Armitage et al. | Aug. 1, 1905 |
| 988,154 | Thiemer | Mar. 28, 1911 |
| 1,311,299 | Therien | July 29, 1919 |
| 1,398,552 | Harris | Nov. 29, 1921 |
| 1,499,659 | Holmes | July 1, 1924 |
| 1,851,843 | Inman | Mar. 29, 1932 |
| 1,931,655 | Hazeltine | Oct. 24, 1933 |
| 1,952,462 | Ruesenberg | Mar. 27, 1934 |
| 2,399,821 | Murphy | May 7, 1946 |
| 2,530,887 | Mandl et al. | Nov. 21, 1950 |

FOREIGN PATENTS

| Number | Country | Date |
|---|---|---|
| 519,226 | Great Britain | Mar. 20, 1940 |